United States Patent [19]
Ohnishi

[11] Patent Number: 5,978,033
[45] Date of Patent: Nov. 2, 1999

[54] MOTION PICTURE ENCODER

[75] Inventor: Osamu Ohnishi, Tokyo, Japan

[73] Assignee: NEC Corporation, Japan

[21] Appl. No.: 09/007,000

[22] Filed: Jan. 14, 1998

[30] Foreign Application Priority Data

Jan. 14, 1997 [JP] Japan ............................... 9-004571

[51] Int. Cl.[6] .................................................. H04N 7/12
[52] U.S. Cl. ........................................ 348/416; 348/419
[58] Field of Search .................................. 348/416, 420, 348/421, 699, 394, 409, 415, 430, 419, 400, 401, 402, 715; 382/236, 238

[56] References Cited

U.S. PATENT DOCUMENTS

| | | | |
|---|---|---|---|
| 5,361,105 | 11/1994 | Iu ............................................. | 348/699 |
| 5,442,407 | 8/1995 | Iu ............................................. | 348/620 |
| 5,469,228 | 11/1995 | Kim et al. ................................. | 348/175 |
| 5,568,196 | 10/1996 | Hamada et al. .......................... | 348/416 |
| 5,796,435 | 8/1998 | Nonomura et al. ...................... | 348/405 |

FOREIGN PATENT DOCUMENTS

| | | |
|---|---|---|
| 61-52085 | 3/1986 | Japan . |
| 1-15231 | 3/1989 | Japan . |
| 1-248785 | 10/1989 | Japan . |
| 6-78296 | 3/1994 | Japan . |
| 7-38889 | 2/1995 | Japan . |
| 7-50829 | 2/1995 | Japan . |

OTHER PUBLICATIONS

Fukinuki, T., *Multi–Dimensional Signal Processing of TV Pictures*, pp. 188–191, Daily Industrial Paper Company of Japan, 1988.

T. Okubo, et al., "Development of a Two Chip Real–Time MPEG2 SP@ML Video Encoder", 1996 general meeting of the Institute of Electronics, Information and Communication Engineers of Japan, C562, p. 178.

S. Kumaki, et al., "A Chip Set for A Programmable Real–Time MPEG2 Video Encoder—A Chip Set Architecture and Controller LSI", The Institute of Electronics, Information and Communication Engineers, ICD95–102, Aug. 1995, pp. 1–8.

*Primary Examiner*—Bryan Tung
*Assistant Examiner*—Gims S. Philippe
*Attorney, Agent, or Firm*—Ostrolenk, Faber, Gerb & Soffen, LLP

[57] ABSTRACT

A motion picture encoder employs a motion compensation predictive encoding method to provide video signals. The motion picture encoder uses a relatively small storage capacity for a frame memory. Specifically, the frame memory has a storage capacity for storing at least two original pictures and one local decoding picture. A noise reducer unit performs a noise reducing process with respect to a present picture signal and a preceding picture signal. For example, a difference value is calculated between the present picture signal and preceding picture signal and is multiplied by a prescribed coefficient, whereupon a result of the multiplication is added to the preceding picture signal. In addition, a motion estimation/compensation unit is provided to perform motion estimation and motion compensation with respect to an encoding picture and a reference picture. A memory control unit is provided to control a data transfer between the noise reducer unit, frame memory and motion estimation/compensation unit. Specifically, the memory control unit controls the frame memory to allow an input of the present picture from the noise reducer unit, an output of the preceding picture to the noise reducer unit, outputs of the encoding picture and reference picture to the motion estimation/compensation unit and an input of the local decoding picture from the motion estimation/compensation unit. An interface between the frame memory and memory control unit has the capacity for a data transfer rate which is five or more times faster than an input rate of video signals.

7 Claims, 11 Drawing Sheets

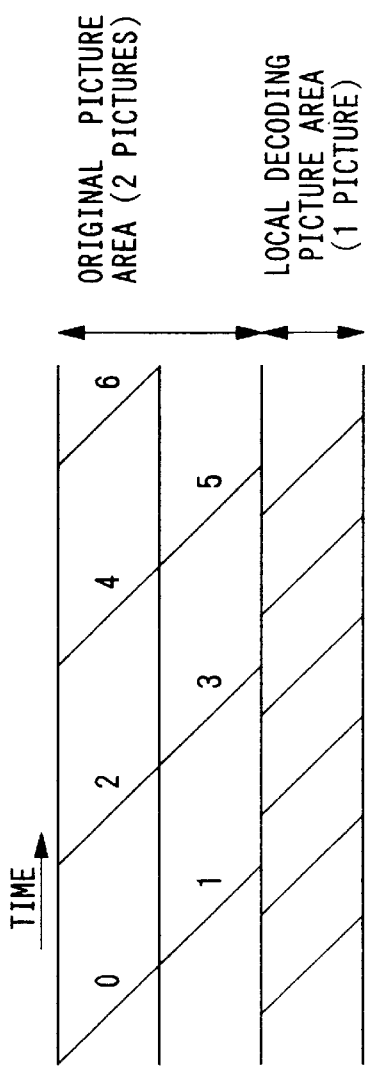
FIG.2A WRITE TO FRAME MEMORY
FIG.2B ① VIDEO SIGNAL [INPUT (102)]
FIG.2C ② PRECEDING PICTURE FOR NOISE REDUCER [OUTPUT (103)]
FIG.2D ③ ENCODING PICTURE [OUTPUT (104)]
FIG.2E ④ REFERENCE PICTURE FOR MOTION COMPENSATION [OUTPUT (104)]
FIG.2F ⑤ LOCAL DECODING PICTURE [INPUT (105)]

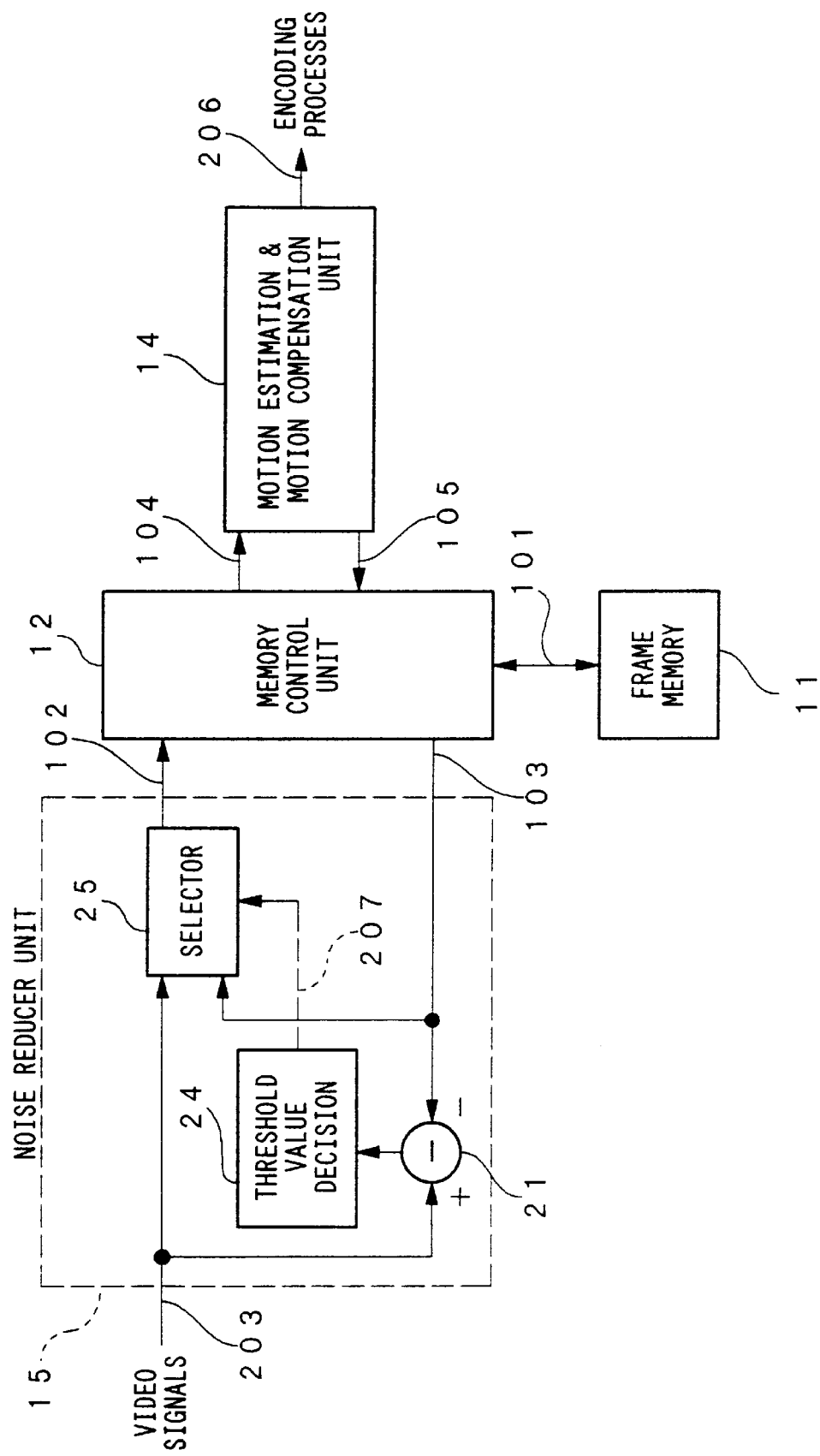

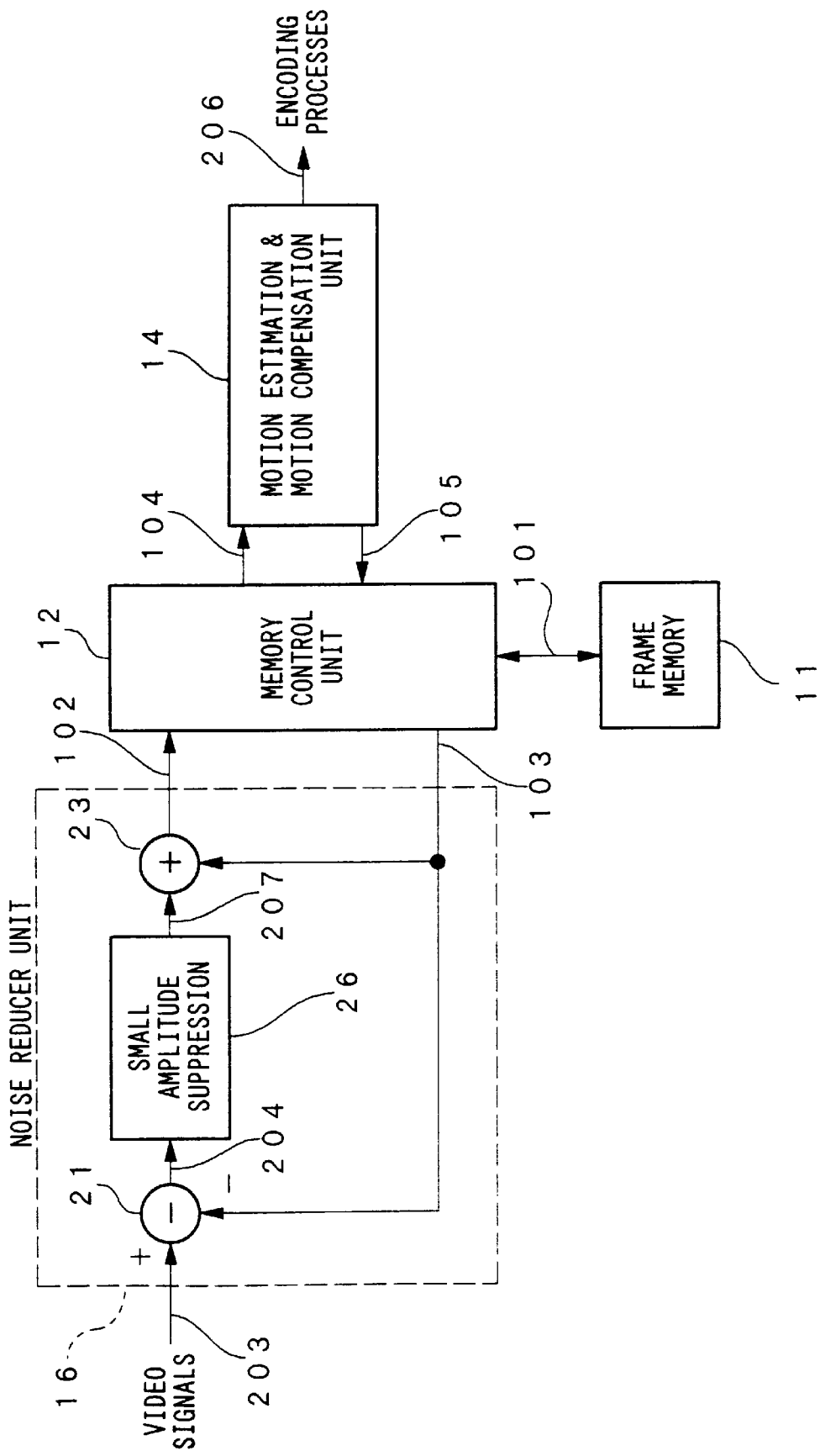

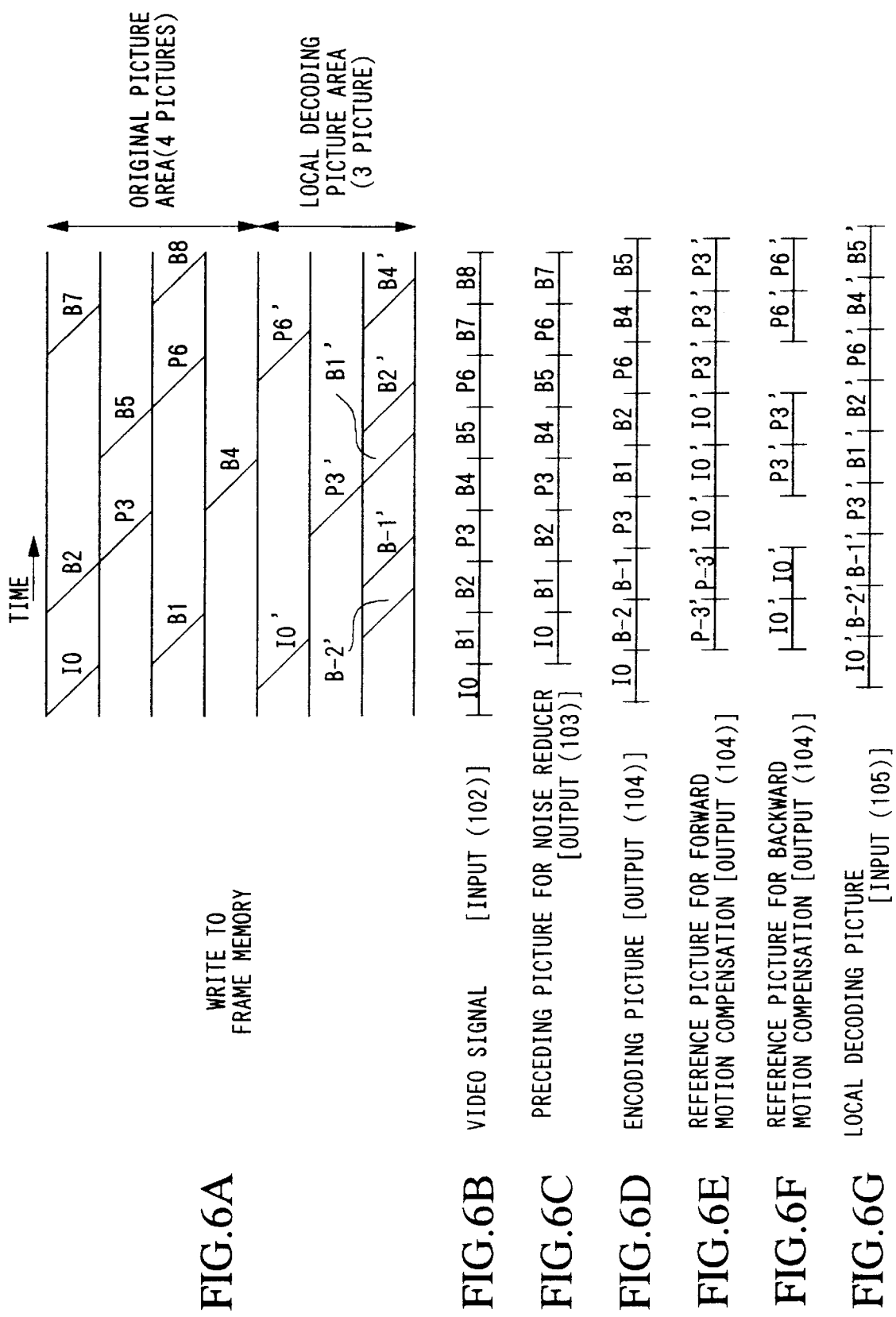

MOTION PICTURE ENCODER

BACKGROUND OF THE INVENTION

1. Field of the Invention

This invention relates to motion picture encoders employing motion picture compressive encoding techniques. This application is based on patent application No. Hei 9-4571 filed in Japan, the content of which is incorporated herein by reference.

2. Prior Art

As the conventional compressive encoding techniques of motion picture signals employed in the motion picture encoders, there are provided international standards called "MPEG-1 (ISO/IEC IS 11172-2)" and "MPEG-2 (ISO/IEC IS 13818-2, ITU-T H.262 recommendation)". Herein, "MPEG" stands for "Motion Picture Experts Group"; "ISO" stands for "International Organization for Standardization"; "ITU" stands for "International Telecommunication Union". Both of the standards employ the motion compensation in the forward and backward directions as the motion compensation predictive encoding method.

FIG. 7 shows a conception for the motion compensation of screen images in the forward and backward directions. Herein, a screen image (or picture on the screen) I0 corresponds to an "intra encoding picture" (hereinafter, referred to as "I picture"). This picture is subjected to encoding using only the information of the screen without using the motion compensation.

A screen image P3 corresponds to a forward motion compensation predictive encoding picture (hereinafter, referred to as "P picture"). This picture P3 is subjected to motion compensation predictive encoding using the I picture I0 as the reference picture. In the example of FIG. 7, a variable M is set a to represent a distance between the I picture and P picture.

After completion of the encoding of the I picture I0 and P picture P3, a picture B1 is subjected to encoding. Herein, the picture B1 corresponds to a bidirectional motion compensation predictive encoding picture (hereinafter, referred to as "B picture"). In the processing of the B picture B1, the present system performs forward motion compensation based on the I picture I0 which is a previous picture for the picture B1 with respect to time. In addition, the present system performs backward motion compensation based on the P picture P3 which is a subsequent picture for the picture B1 with respect to time. Next, a B picture B2 is subjected to encoding which is performed subsequently to the encoding of the B picture B1.

FIGS. 8 and 9 show time-related relationships between picture inputs and encoding processes. Specifically, the relationships of FIG. 8 are provided with regard to the case where only the forward motion compensation is performed, while the relationships of FIG. 9 are provided with regard to the case where both the forward motion compensation and backward motion compensation are performed. First, in the case of FIG. 8 where only the forward motion compensation is performed, the delay occurs due to differences in the manner of handling data in the picture input and encoding processes. That is, in the picture input, a supply of data is processed normally by using one line at a time as a unit. For the encoding processes, in the case of the MPEG-1 and MPEG-2, for example, a macro block constructed by 16×16 pixels is used as a unit of encoding. For this reason, it is necessary to provide the picture inputs of 16 lines in advance.

In the case of FIG. 9 which uses the backward motion compensation predictive encoding method, it is necessary to note that an input order of pictures is different from an order of encoding. Herein, a variable GOP is set to a value of "15" to represent an interval between I pictures while M is set to a value of "3". In the case where the present system uses the forward motion prediction based on the I picture and P picture only, it is necessary to provide a frame memory for retaining information of the reference picture. It is obvious from FIG. 9 that before performing the encoding process of the B picture, the present system waits for completion of the encoding process of the I picture or P picture which is the reference picture for the backward motion compensation prediction. In order to retain an original picture of the B picture during the above wait time, it is necessary to provide a number of frame memories representative of the value of M.

Meanwhile, there is provided a noise reducer of digital video signals, an example of which is disclosed by a book written by Mr. Takahiko Fukinuki and entitled "Multi-Dimensional Signal Processing of TV Pictures" (pp. 188–191), which is issued by the Daily Industrial Paper Company of Japan in 1988. According to this book, it is well known that the recursive filter functions effectively on the time axis. In such a recursive filter on the time axis, a frame memory having a storage of one screen image is required for the calculations of differences based on the previous pictures.

The conventional technology has already developed picture encoders having functions of motion compensation predictive encoding and noise reducing. This technology is described in a technical report written by Mr. Okubo and his members and entitled "Development of a Two Chip Real-Time MPEG2 SP@ML Video Encoder" in the technical-report collection C562 of the 1996 general meeting of the Institute of Electronics, Information and Communication Engineers of Japan, and in another technical report written by Mr. Kumaki and his members and entitled "A Chip Set for a Programmable Real-Time MPEG2 Video Encoder—A Chip Set Architecture and Controller LSI" in the technical report ICD95-102 (issued on August of 1995) of the Institute of Electronics, Information and Communication Engineers of Japan.

FIG. 10 shows a configuration of an encoder using multiple frame memories in accordance with the conventional system. The conventional system uses independent memory components respectively for the frame memory provided for the motion compensation prediction and the frame memory provided for the video signal pre-processing such as the noise reduction. As described above, the conventional system has a configuration which requires multiple frame memories each corresponding to a memory component having a large capacity. With such a configuration, it is difficult to reduce the size of the encoder system as well as of the cost of the encoder system.

A variety of proposals have been made with respect to reduction of the capacity of the frame memory, wherein one such proposal is disclosed in Japanese Patent Laid-Open Publication No. 61-52085. The configuration disclosed in the above paper is shown in FIG. 11. This configuration is designed to provide motion compensation which is actualized by only forward prediction based on the preceding picture. In FIG. 11, a noise elimination circuit corresponding to the block enclosed in the dotted line contains a memory-A 9104. Herein, signals which are delayed by a time of one picture or less are extracted from the memory-A 9104 and are subjected to motion vector detection. In short, one memory is used for both noise reduction and motion compensation. For this reason, the system of FIG. 11 has the advantage that the configuration thereof can be actualized using a relatively small memory capacity which is smaller than that of the conventional system and which provides memories for noise reduction and motion compensation respectively.

In the system of FIG. 11, however, the delay time of the memory-A is accurately less than the time of one picture. In order to make a sum of the delay of the system to coincide with the time of one picture, the noise elimination circuit requires a memory-B 9105. In addition, the system requires a frame memory 915 for local decoding signals, independently of the aforementioned memories. For this reason, the system of FIG. 11 is problematic in that the number of components for the frame memories is increased.

SUMMARY OF THE INVENTION

It is an object of the present invention to provide a motion picture encoder which can be configured using a small number of memory components for frame memories to actualize the noise reduction process as well as the motion compensation predictive encoding process.

A motion picture encoder of this invention employs a motion compensation predictive encoding method to provide video signals. The motion picture encoder is configured by a noise reducer unit, a frame memory, a motion estimation/compensation unit and a memory control unit. Herein, the frame memory has a relatively small storage capacity, i.e., a storage capacity for storing at least two original pictures and one local decoding picture. The noise reducer unit performs a noise reducer process with respect to a present picture and a preceding picture. The motion estimation/compensation unit performs motion estimation and motion compensation with respect to an encoding picture and a reference picture.

The memory control unit controls a data transfer between the noise reducer unit, frame memory and motion estimation/compensation unit. That is, the memory control unit controls the frame memory to allow an input of the present picture from the noise reducer unit, an output of the preceding picture to the noise reducer unit, outputs of the encoding picture and reference picture to the motion estimation/compensation unit and an input of the local decoding picture from the motion estimation/compensation unit.

This invention is characterized in that the noise reducer process and motion compensation predictive encoding process are performed using a small number of components for the frame memory. In addition, an interface between the frame memory and memory control unit has a great capacity for data transfer which is five or more times faster than an input rate of video signals.

BRIEF DESCRIPTION OF THE DRAWINGS

These and other objects of the subject invention will become more fully apparent as the following description is read in light of the attached drawings wherein:

FIG. 2A is a time chart showing the write timing of pictures into a frame memory shown in FIG. 1;

FIGS. 2B, 2C, 2D, 2E and 2F are simplified time charts showing relationships between inputs and outputs of picture signals with respect to a memory control unit shown in FIG. 1;

FIG. 3 is a block diagram showing a configuration of a motion picture encoder in accordance with a second embodiment of the invention;

FIG. 4 is a block diagram showing a configuration of a motion picture encoder in accordance with a third embodiment of the invention;

FIG. 6A is a time chart showing the write timing of pictures into a frame memory of FIG. 4;

FIGS. 6B, 6C, 6D, 6E, 6F and 6G are simplified time charts showing relationships between inputs and outputs of pictures with respect to a memory control unit shown in FIG. 4;

DESCRIPTION OF THE PREFERRED EMBODIMENT

Figure 1:
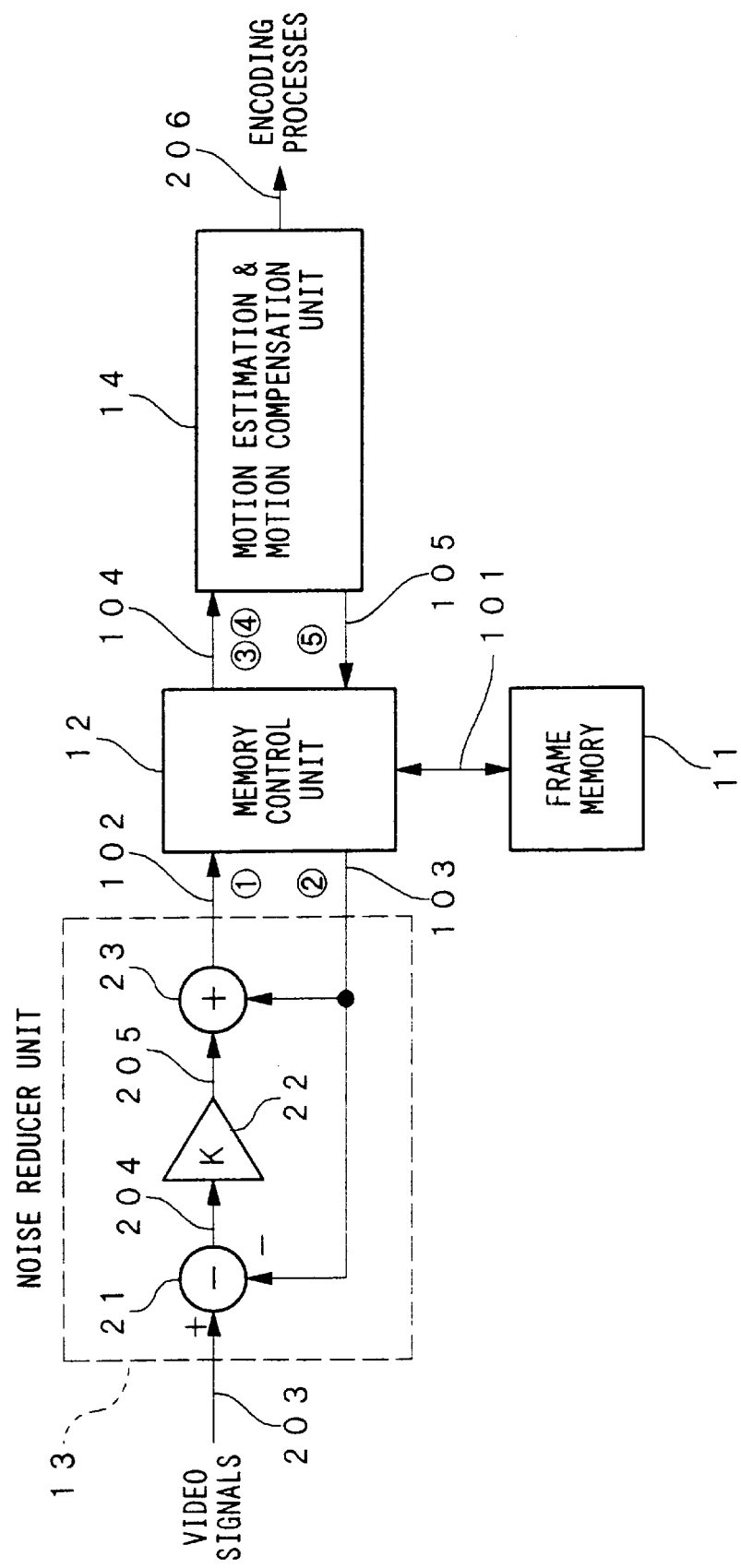
FIG. 1 is a block diagram showing a configuration of a motion picture encoder in accordance with an embodiment of the invention.

FIG. 1 shows a configuration of a motion picture encoder in accordance with an embodiment of the invention.

A frame memory 11 has a total storage capacity of three pictures of a video sequence, wherein storage of two pictures is provided for original picture signals while storage of one picture is provided for local decoding signals. A memory control unit 12 is connected to the frame memory 11 as well as a noise reducer unit 13 and a motion estimation and motion compensation unit 14. An input line 203 is provided to input video signals to the motion picture encoder of FIG. 1. Signals of a preceding picture of the sequence are read from the frame memory 11 and are supplied to the noise reducer unit 13 from the memory control unit 12 via a signal line 103. A subtractor 21 calculates difference values between the input video signals and the signals of the preceding picture.

A multiplier 22 performs a multiplication operation to multiply the difference value output from the subtractor 21 by a coefficient K which is greater than "0" but is less than "1". Thus, the multiplier 22 outputs a product of the multiplication operation, which is then forwarded to an adder 23. The adder 23 performs an addition process to add the product of the multiplier 22 to the signal of the preceding picture given thereto from the signal line 103. An output of the adder 23 is provided as an output signal of the noise reducer unit 13 and is supplied to the memory control unit 12 via a signal line 102. Then, the output signal of the noise reducer unit 13 is supplied to the frame memory 11 via a signal line 101 and is stored in the frame memory 11.

As described before, the memory control unit 12 is connected to the motion estimation and motion compensation unit 14 (hereinafter, simply referred to as a motion estimation/compensation unit 14). Herein, an encoding picture signal and a reference picture signal are provided for the motion estimation. Those two signals are transferred to the motion estimation/compensation unit 14 via a signal line 104. The motion estimation/compensation unit 14 performs the motion estimation in accordance with the block matching method which is described in the standard of MPEG-1 (ISO/IEC11172-2). As for the method of motion estimation, it is possible to employ any of method which uses the encoding picture signal and reference picture signal other than the block matching method. The motion estimation/compensation unit 14 performs motion compensation on the basis of the result of the motion estimation so as to produce a local decoding signal. The local decoding signal is supplied to the memory control unit 12 via a signal line 105. Then, the local decoding signal is supplied to the frame memory 11 via the signal line 101 and is stored in the frame memory 11.

FIG. 2A shows the write timing of pictures into the frame memory 11 with regard to the most simple case where only the forward prediction is performed. FIGS. 2B to 2F show relationships between inputs and outputs of pictures with respect to the memory control unit 12.

In the above figures, numerals 0, 1, 2, ... designate input picture numbers respectively while numerals 0', 1', 2', ... designate local decoding picture numbers respectively. Incidentally, the frame memory 11 designates a storage area for two pictures of the sequence of original pictures. Accordingly, data of the original pictures are alternatively written into the frame memory 11 in an order of the numerals of 0, 1, 2, ... In addition, the frame memory 11 designates a storage area for one local decoding picture.

Now, a description will be given with respect to an operation of the motion picture encoder of FIG. 1 by using signals ① to ⑤ (see FIG. 1).

First, a video signal ① from the noise reducer unit 12 is input to the memory control unit 12 via the signal line 102. A preceding picture signal ② is provided on the signal line 103. The memory control unit 12 provides an original picture signal ③ as representation of an encoding picture in the sequence and also provides a local decoding signal ④ as the reference picture signal. Those signals ③ and ④ are forwarded to the motion estimation/compensation unit 14 via the signal line 104. Further, the motion estimation/compensation unit 14 provides a local decoding signal ⑤ as a result of the motion estimation and motion compensation. The local decoding signal ⑤ is input to the memory control unit 12 via the signal line 105.

As a result, the frame memory 11 has two inputs and three outputs. That is, the frame memory 11 contributes an input of a present picture from the noise reducer unit 13 and an input of the local decoding picture from the motion estimation/compensation unit 14. In addition, the frame memory 11 contributes an output of a preceding picture to the noise reducer unit 13 as well as the outputs of the encoding picture and reference picture to the motion estimation/compensation unit 14.

The signal line 101 represents an interface between the memory control unit 12 and the frame memory 11. If the interface has a transfer speed which is five or more times faster than the video signal input rate required by the encoding process format so that the interface performs the encoding processes in a time sharing manner, it is possible to handle all of the five kinds of input/output operations of the pictures described above.

Next, a description will be given with respect to an example of the operation of the motion picture encoder of the present embodiment. Incidentally, the present embodiment employs the encoding method corresponding to MPEG-1 which uses forward prediction only. However, this invention is capable of employing other methods of motion compensation predictive encoding.

Video signals input to the noise reducer unit 13 are based on the prescribed screen size corresponding to SIF (Source Input Format). Herein, the luminance signal (Y) is provided with respect to a number of pixels, i.e., 352×240 per frame while the chrominance signals (C; Cb, Cr) are provided with respect to a number of pixels, i.e., 176×120 per frame. Each pixel is represented by 8 bits. In addition, the frame frequency is set at 30 frames per second. In the first embodiment described heretofore, the SIF video signals are produced by performing down-sampling of video signals defined by the international standard (i.e., ITU-R 601 recommendation).

According to the ITU-R601, the sampling frequency of pixels is set at 13.5 MHz; an effective number of pixels per one frame for the Y signal is 720×480; an effective number of pixels per one frame for the Cb, Cr signals is 360×480; each pixel is represented by 8 bits. In addition, a screen size including a blank period is 858×525. The ITU-R601 serves to interlace signals which are provided with respect to each field. The processing by the ITU-R601 is used as preprocessing for creation of the SIF video signals. After pre-processing, the system selects odd-number fields (i.e., down-sampling of Y and C the vertical direction) while performing ½ down-sampling of Y and C in the horizontal direction and cutoff of the right and left ends as well as down-sampling of C in the vertical direction; thus, it is possible to create the SIF video signals. Herein, an average supply rate of video signals is calculated with regard to an effective line of odd-number fields in accordance with the following equation:

$$13.5 \times 8 \times 352/858 \times 1.5 = 66 \text{ Megabits/second.}$$

In the above equation, the number of "1.5" is provided based on the fact that the sum the number of pixels of the Cb and Cr signals is 0.5 times smaller than the number of pixels of the Y signal.

Other than the functions of the aforementioned noise reducer unit, memory control unit and motion estimation/compensation unit shown in FIG. 1, we have manufactured an example of a usage-specified LSI chip having a combination of functions which correspond to down-sampling processes for generation of the aforementioned SIF video signals, DCT and reverse DCT processes required in the MPEG-1 encoding (where "DCT" stands for "Discrete Cosine Transform"), quantization and reverse quantization processes, and variable-length encoding processes. In the noise reducer unit 13, the multiplier 22 uses a difference value, output from the subtractor 21 as a multiplicand and a multiplier K. Herein, the multiplier K can be designated from an external device or the like and is represented by a fifteen-stage value ranging between ¹⁄₁₆ and ¹⁵⁄₁₆. The multiplier 22 performs multiplication by the shift operation and addition. Of course, it is possible to employ any circuit configuration having the capability to perform multiplication processes as multiplier 22. The memory control unit 12 is configured by a line buffer for frequency conversion and a timing management circuit which are provided in connection with the noise reduction unit, motion estimation and motion compensation unit, as well as an address generation circuit which is provided for the frame memory. The above LSI chip is manufactured using the 0.35 μm—metal 3 layers CMOS technique (where "CMOS" stands for "Complementary Metal-Oxide Semiconductor"). The LSI chip has a square circuit portion measuring is 11.2 mm per side.

The LSI chip which is used in the encoding processes described above is connected to an SDRAM (an abbreviation for "Synchronous Dynamic Random-Access Memory") of 4 Megabits (i.e., 16 bit×256 kilo word) which acts as the frame memory 11. Herein, an operating frequency of 54 MHz is set for the LSI chip and SDRAM. The SIF picture has a certain amount of data per frame which is calculated as follows:

$$352 \times 240 \times 8 \times 1.5 = 1013760 \text{ bits.}$$

Roughly speaking, one frame of the SIF picture corresponds to 1 Megabit of data. The SDRAM has a storage capacity of 4 Megabits. In the SDRAM, 3 Megabits are designated as a storage area for two frames of original pictures and for one frame of a local decoding picture, whilst the remaining 1 Megabit is used as an output buffer for outputting bit streams which are produced based on results of the encoding processes. Incidentally, a transfer capability of 16×54=864 Megabits/second is provided for data transfer between the LSI chip and the SDRAM. It is important that the above value of the transfer capability greatly exceeds five-times the value of the foregoing data input rate of 66 Megabits/second.

The first embodiment has the foregoing circuit configuration which is limited in function to the forward prediction method. Such a circuit configuration is capable of producing bit streams based on the MPEG-1 standard. In addition, we have confirmed by subjective evaluation that the flicker due to noise can be reduced with respect to the video signals of the original pictures on the display screen.

FIG. 3 shows an example of a configuration of a motion picture encoder in accordance with a second embodiment of the invention. Like the aforementioned first embodiment of FIG. 1, the second embodiment of FIG. 3 uses the MPEG-1 standard for the encoding method, wherein video signals based on the SIF format are input to a noise reducer unit 15 while a SDRAM of 4 Megabits is used for the frame memory 11. Further, the functions of the memory control unit and the motion estimation/compensation unit are similar to those of the aforementioned first embodiment. The noise reducer unit 15 of the second embodiment is configured as follows:

A subtractor 21 calculates a difference value between a present picture signal and a preceding picture signal. The difference value is input to a threshold value decision circuit 24 wherein its absolute value is compared with a threshold value. As a result of the comparison, the threshold value decision circuit 24 produces a control signal which is supplied to a selector 25 via a signal line 207. As a result, the selector 25 performs a selection on the basis of the absolute value of the difference value calculated between the present picture signal and preceding picture signal. That is, the preceding picture signal is selected when the absolute value is relatively small, whereas the present picture signal is selected when the absolute value is relatively large. Then, the selector 25 outputs the selected picture signal.

In the second embodiment, the noise reducer unit 15 is designed in such a way that a same threshold value of "3" is set for both the Y and C signals in response to an input of 8 bits. Accordingly, the noise reducer unit 15 selectively outputs the preceding picture information when the absolute value of the difference value is equal to or less than "3", and outputs the present picture information when the absolute value is greater than "3". Incidentally, it is possible to use a value other than "3" for the threshold value. Like the aforementioned first embodiment, we have manufactured a LSI chip specified to the encoding process by using the 0.35 μm—metal three layers CMOS technique. Herein, the LSI chip has a square circuit portion having sides each measuring 11.2 mm. In addition, we have confirmed that the LSI chip is capable of actually performing both the encoding process and noise reducing process.

FIG. 4 shows an example of a configuration of a motion picture encoder in accordance with a third embodiment of the invention. The third embodiment uses the MPEG-2 standard for the encoding process. Specifically, the third embodiment uses the MP@ML (Main Profile, Main Level) method of the MPEG-2 standard. This method uses backward prediction wherein the effective number of pixels is set at 720×480 for the Y signal and 360×240 for the Cb and Cr signals. In addition, video signals input to the third embodiment are created by performing ½ down-sampling on the ITU-R601 format video signals (used in the first embodiment) with respect to only the C signal in the vertical direction. The input rate of the video signals of the third embodiment is calculated as follows:

$$13.5 \times 8 \times 720/858 = 91 \text{ Megabits/second.}$$

Figure 5A:
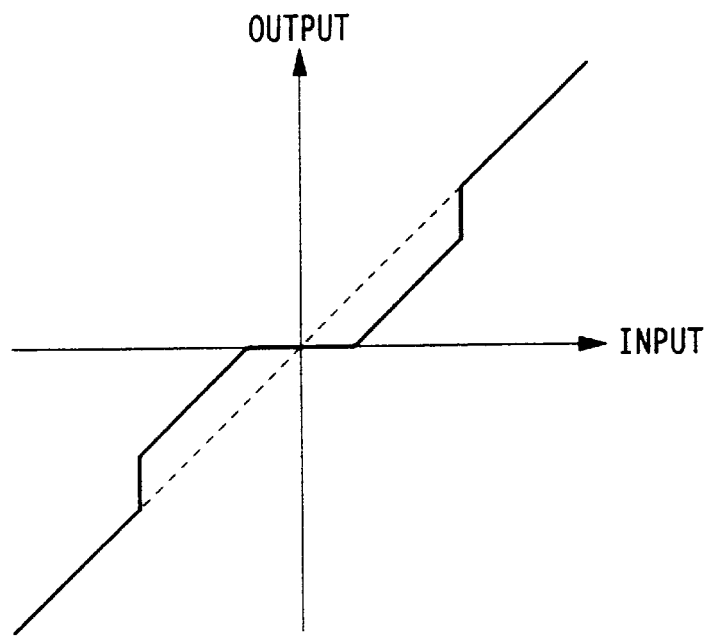
FIGS. 5A and 5B are graphs showing input-output characteristics of a small amplitude suppression circuit used in a noise reducer unit shown in FIG. 4.
Figure 5B:
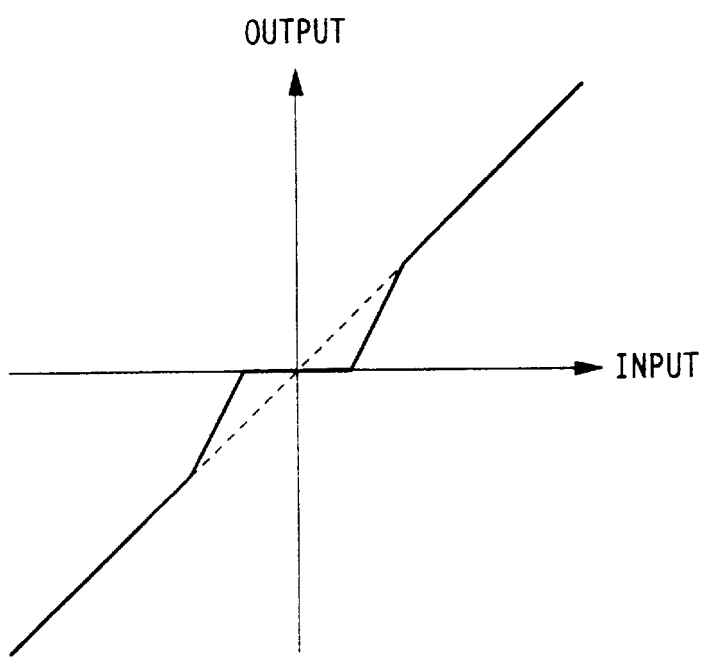
Figure 7:
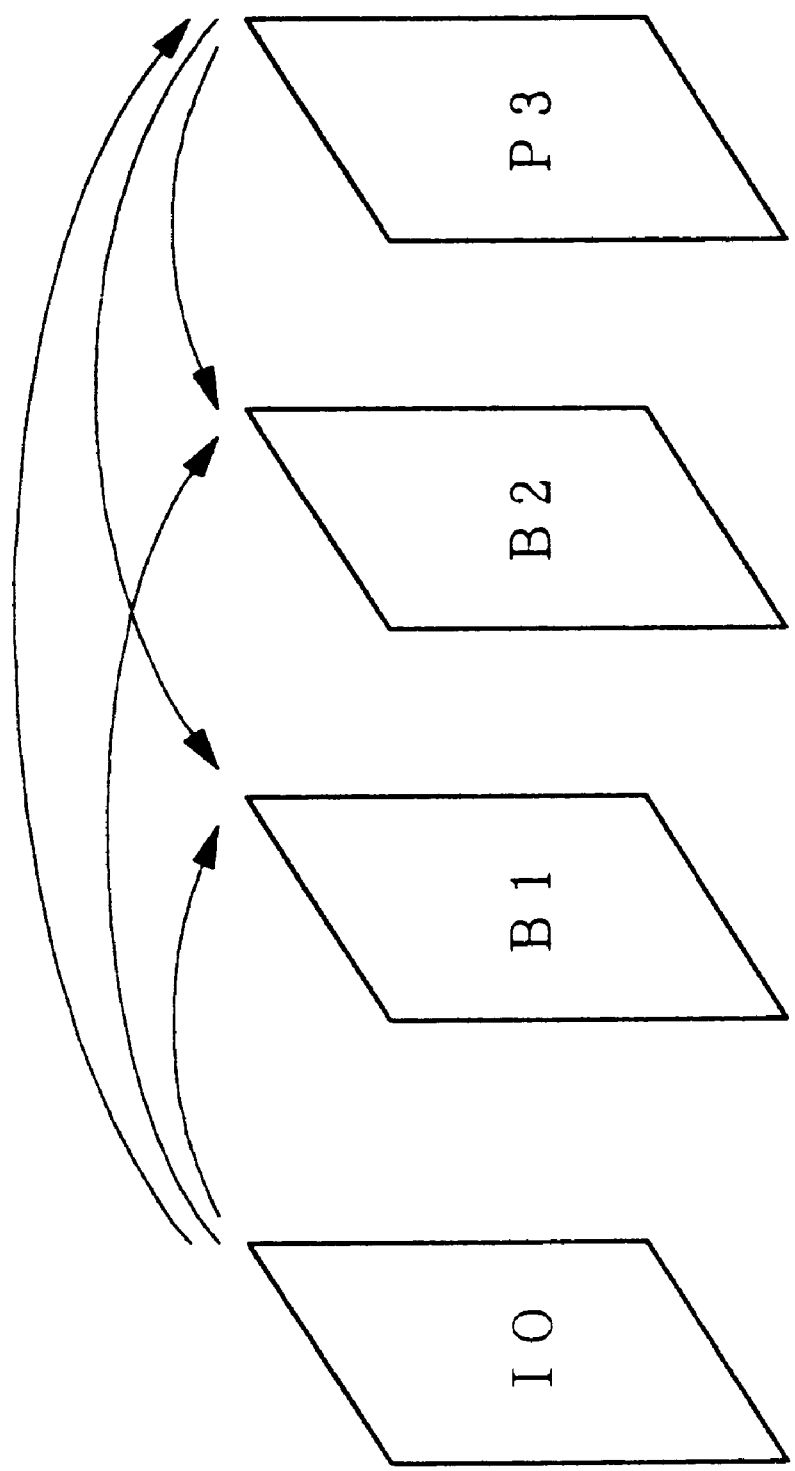
FIG. 7 is a conceptual drawing showing relationships between pictures which are used to explain forward motion compensation and backward motion compensation.
Figure 8:
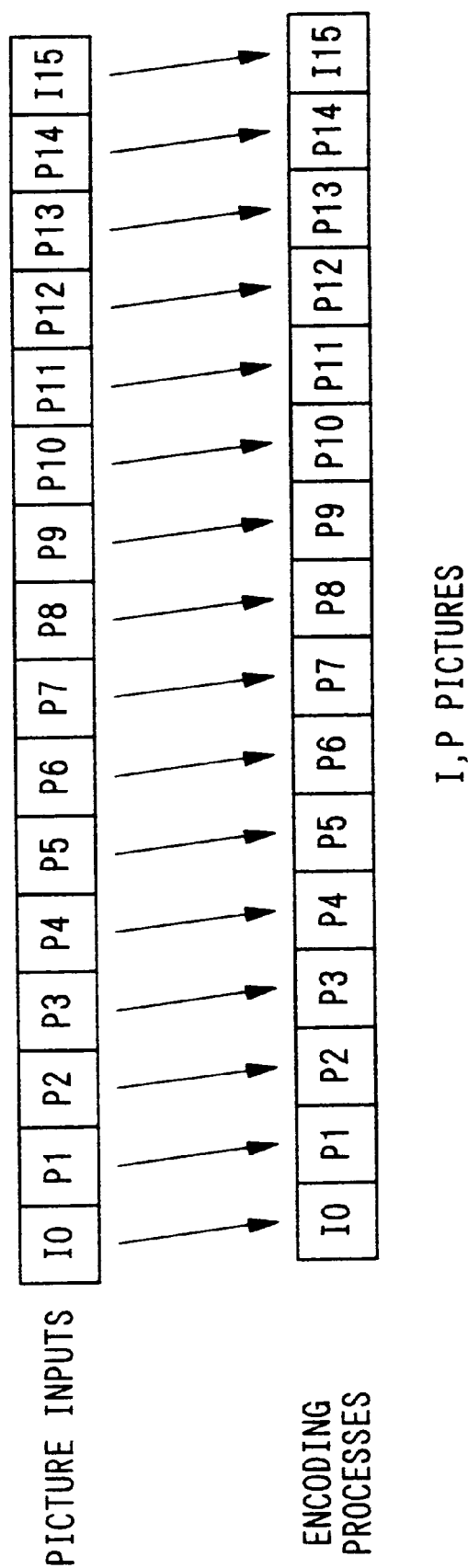
FIG. 8 shows relationships between picture inputs and encoding processes in the motion compensation predictive encoding with only forward motion compensation.
Figure 9:
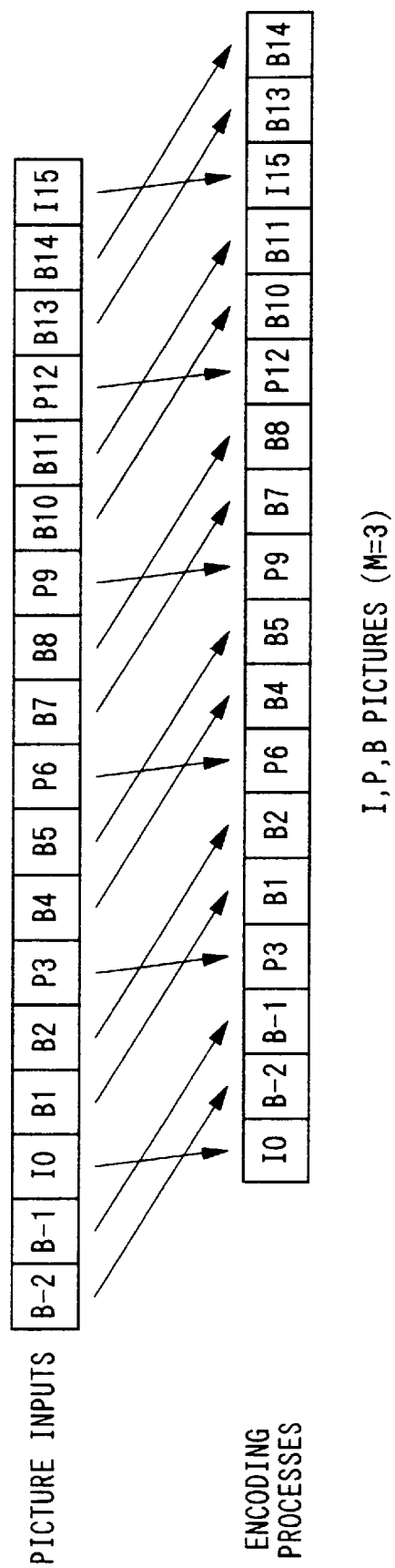
FIG. 9 shows relationships between picture inputs and encoding processes in the motion compensation predictive encoding with both forward motion compensation and backward motion compensation.
Figure 10:
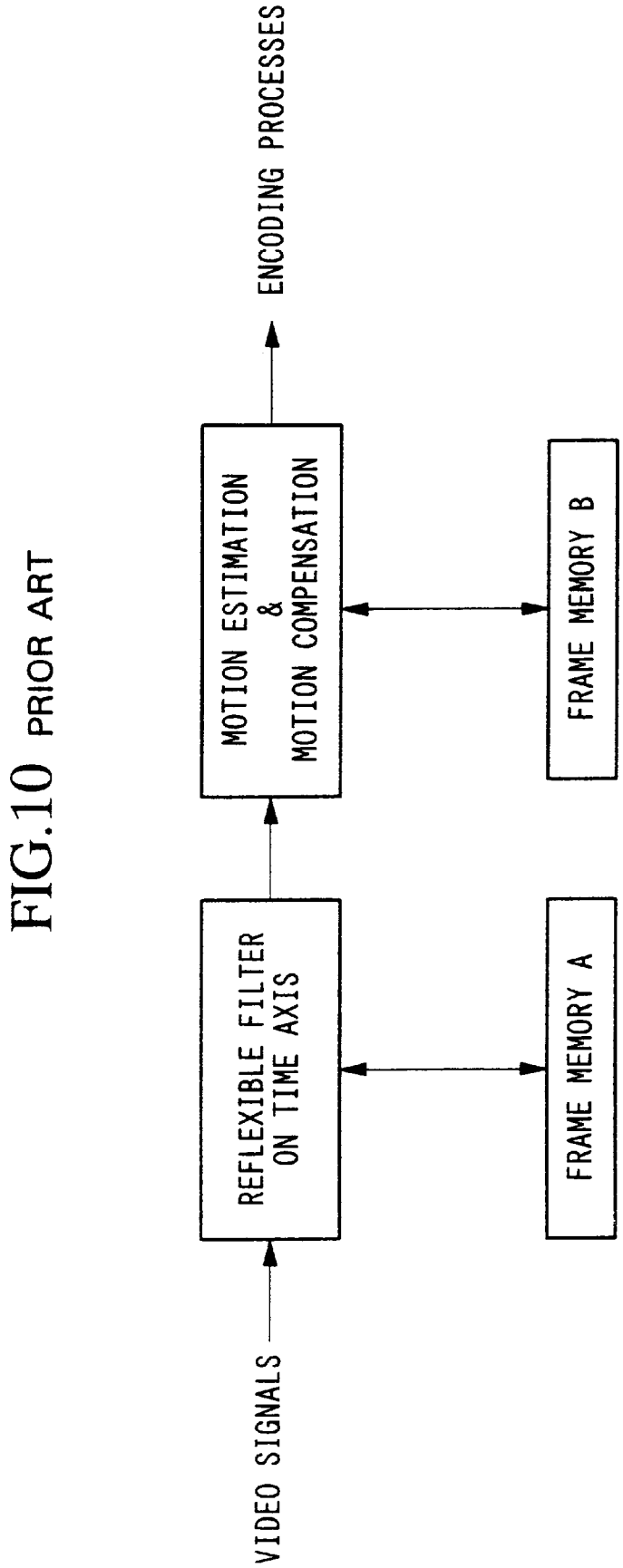
FIG. 10 is a block diagram showing an example of a configuration for a motion picture encoder which provides multiple frame memories for the motion compensation prediction.
Figure 11:
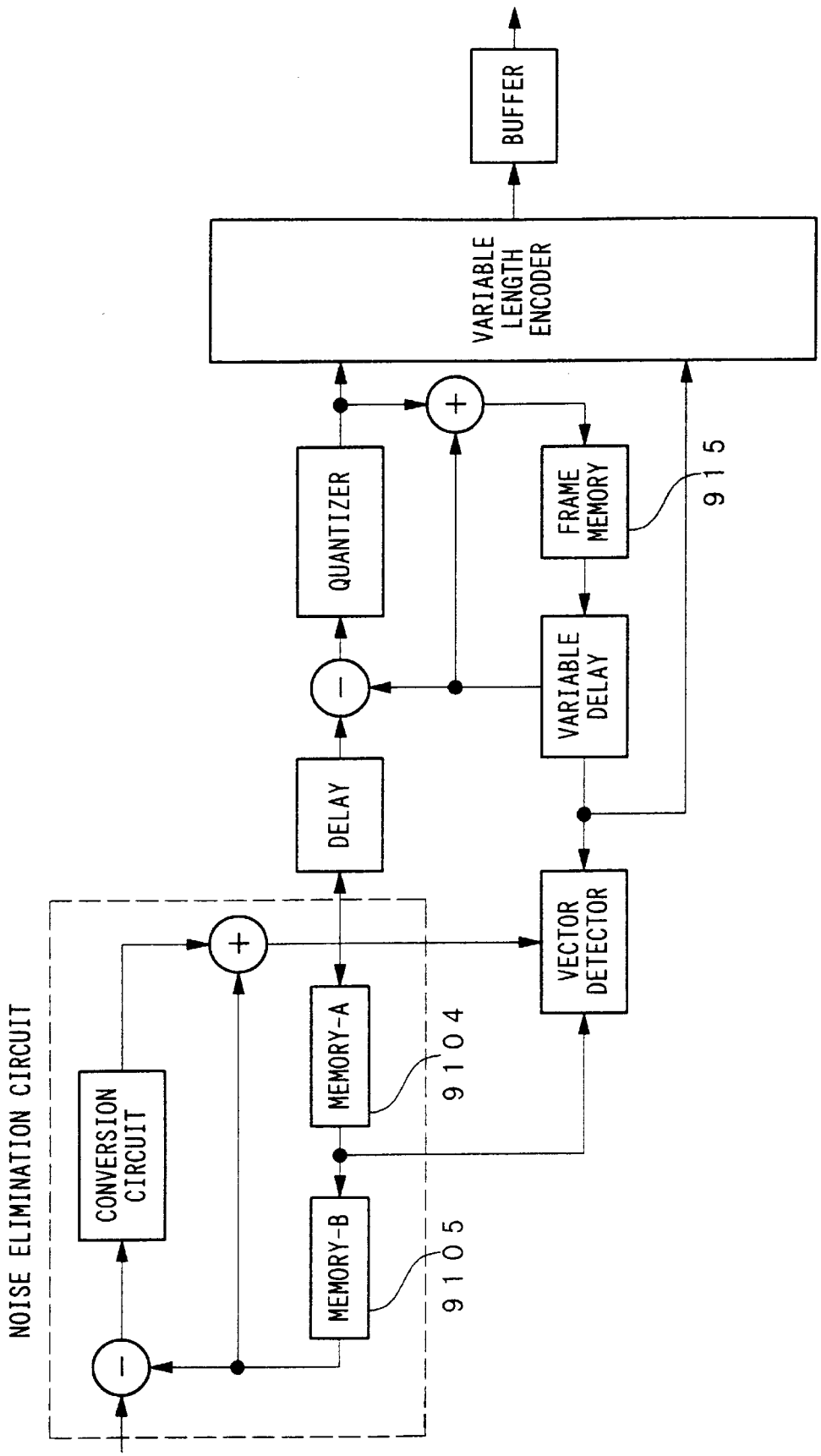
FIG. 11 is a conventional example of a motion picture encoder using multiple frame memories.

The third embodiment of FIG. 4 employs a noise reducer unit 16 which is configured as follows:

A subtractor 21 calculates a difference value between a preceding picture signal and a present picture signal. The difference value is input to a small amplitude suppression circuit 26. The small amplitude suppression circuit 26 suppresses the absolute value of an input thereto which is relatively small. On the other hand, the small amplitude suppression circuit 26 directly outputs an input thereto whose absolute value is relatively large. Examples of input-output characteristics of the small amplitude suppression circuit 26 are shown in FIGS. 5A and 5B. The input-output characteristics of FIG. 5A have different processes with respect to three regions corresponding to input absolute values of the small amplitude suppression circuit 26. As for a first region where the input absolute value is small in proximity to "0", the output of the small amplitude suppression circuit 26 is set at "0". As for a second region where the input absolute value is larger than that of the first region, a certain value is subtracted from the input absolute value to produce an output of the small amplitude suppression circuit 26. As for a third region where the input absolute value is larger than that of the second region, the input is directly provided as an output of the small amplitude suppression circuit 26. The input-output characteristics of FIG. 5B have different processes with respect to three regions corresponding to input absolute values of the small amplitude suppression circuit 26. As for a first region where the input absolute value is small in proximity to "0", the output of the small amplitude suppression circuit 26 is set at "0". As for a second region where the input absolute value is larger than that of the first region, a value which is linearly increased to produce an output of the small amplitude suppression circuit 26. As for a third region where the input absolute value is larger than that of the second region, the input is directly provided as an output of the small amplitude suppression circuit 26.

Concretely speaking, the small amplitude suppression circuit 26 is configured by gate circuits which function in accordance with the input-output characteristics of FIG. 5A which follow the three regions corresponding to input absolute values. That is, for a first region where the input absolute value is equal to or less than "1", the output is set at "0". As for a second region where the input absolute value ranges between "2" and "6", "1" is subtracted from the input absolute value to produce an output. As for a third region where the input absolute value is equal to or greater than "7", the input is directly provided as the output. Incidentally, the input-output characteristics of the small amplitude suppression circuit 26 are not limited to the aforementioned input-output characteristics. Namely, it is possible to employ any other input-output characteristics which are capable of performing suppression of small amplitudes in the input. Further, the third embodiment is actualized using gate circuits. However, it is possible to use other circuit components or elements such as a ROM, for example.

In the third embodiment of FIG. 4, two SDRAMs of 16 Megabits (i.e., 16 bit×1 Mega word) are combined together to configure a frame memory of 32 Megabits. On the basis of the aforementioned number of pixels, one frame has an amount of data which is calculated as follows:

720×480×8×1.5=4147200 bits

Specifically, the amount of data in one frame is roughly 4 Megabits. In the frame memory of 32 Megabits, a storage area for four frames is secured for original pictures while a storage area for three frames is secured for local decoding pictures. In addition, a variable M is set to a value of "3" which corresponds to a distance between the I and P pictures. FIG. 6A shows the write timing of pictures into the frame memory 11. FIGS. 6B to 6G show relationships between inputs and outputs of pictures with respect to the memory control unit 12.

Between the frame memory 11 and the memory control unit 12 which performs the forward motion compensation as well as the backward motion compensation, there are provided six types of read/write operations as shown in FIGS. 6B to 6G. That is, the frame memory 11 stores for transfer each of an input of a present picture from the noise reducer unit 16, an output of a preceding picture to the noise reducer unit, an output of an encoding picture to the motion estimation/compensation unit 14, an output of a reference picture for forward motion compensation, an output of a reference picture for backward motion compensation and an input of a local decoding picture from the motion estimation/compensation unit 14. For this reason, it is necessary to provide a large transfer capability which is greater than the input rate of the video signals six times or more.

The third embodiment employs an operating frequency of 81 MHz with respect to the frame memory 11 and the memory control unit 12. Herein, the rate of data transfer between the frame memory 11 and the memory control unit 12 is calculated as follows:

16×2×81=2592 Megabits/second.

The above value of the transfer rate is very large being about 28 times greater than the input rate of the video signals. Therefore, it is possible to perform a transfer of data in a reference region which is very large as compared to an encoding region, so as to actualize a broad range for the estimation. However, a transfer rate of the input 28-times transfer rate is not always required for actualization of the present embodiment. As a minimum, the third embodiment requires a transfer rate of at least 6-times the input rate.

Now, we have manufactured a LSI chip, specified to the encoding process, which incorporates the functions of the noise reducer unit, motion estimation/compensation unit and memory control unit as well as functions of DCT and reverse DCT processes, quantization and reverse quantization processes and variable-length encoding process which are required for encoding based on MPEG-2MP@ML. The LSI chip is manufactured using the 0.35 μm—metal three layers CMOS technique. Herein, the LSI chip has a square circuit portion measuring 12.5 mm per side. In addition, we have confirmed that the LSI chip is capable of actually performing the MPEG-2MP@ML encoding process as well as the noise reducer process which contributes to reduction of flicker on display screen.

As this invention may be embodied in many forms without departing from the spirit of essential characteristics thereof, the present embodiments are therefore illustrative and not restrictive, since the scope of the invention is defined by the appended claims rather than by the description preceding them, and all changes that fall within metes and bounds of the claims, or equivalence of such metes and bounds are therefore intended to be embraced by the claimed invention.

What is claimed is:

1. A motion picture encoder employing a motion compensation predictive encoding method, comprising:

a frame memory having a storage capacity to store at least three but less than all pictures of a motion picture sequence which correspond to a prescribed picture format for encoding, wherein two pictures correspond to original pictures while one picture corresponds to a local decoding picture;

a noise reducer unit for processing a video signal input thereto based on a difference value between a present picture signal and a preceding picture signal;

a motion estimation/compensation unit for performing motion estimation and motion compensation with respect to an encoding picture and a reference picture; and a memory control unit connected to the frame memory, the noise reducer unit, and the motion estimation/compensation unit respectively, wherein the memory control unit controls the frame memory to allow data transfer of at least five types of picture signals into or out of said frame memory through the memory control unit, the at least five types of picture signals corresponding to an input of a present picture from the noise reducer unit, an output of a preceding picture to the noise reducer unit, an output of the encoding picture to the motion estimation/compensation unit, an output of the reference picture to the motion estimation/compensation unit and an input of a local decoding picture from the motion estimation/compensation unit.

2. A motion picture encoder as defined in claim 1, wherein the noise reducer unit multiples the difference value by a coefficient which is greater than "0" but is less than "1", and adds the multiplication result to the preceding picture signal.

3. A motion picture encoder as defined in claim 1, wherein the noise reducer unit outputs the preceding picture signal when the difference value is less than a threshold value, and outputs the present picture signal when the difference value is greater than the threshold value.

4. A motion picture encoder as defined in claim 1, wherein the noise reducer unit suppresses an absolute value of the difference value when the difference value represents a small amplitude, and adds the suppressed absolute value to the preceding picture signal.

5. A motion picture encoder employing a motion compensation predictive encoding method, comprising:

a frame memory which is capable of storing at least two original pictures and one local decoding picture provided in a prescribed video screen format for encoding;

a noise reducer unit for performing a noise reducing process with respect to a present picture signal and a preceding picture signal;

a motion estimation/compensation unit for performing motion estimation and motion compensation with respect to an encoding picture and reference picture; and a memory control unit for controlling the frame memory to allow an input of a present picture into the frame memory from the noise reducer unit through the memory control unit, an output of a preceding picture from the frame memory through the memory control unit to the noise reducer unit, an output of the encoding picture from the frame memory through the memory control unit to the motion estimation/compensation unit, and output of the reference picture from the frame memory through the memory control unit to the motion estimation/compensation unit and an input of the local decoding picture into the frame memory from the motion estimation/compensation unit through the memory control unit.

6. A motion picture encoder as defined in claim 5, wherein the prescribed video screen format corresponds to a SIF video format according to which prescribed numbers of pixels are provided in Y, Cb and Cr signals, respectively.

7. A motion picture encoder as defined in claim 5, wherein an interface between the frame memory and the memory control unit has a capacity for a data transfer rate which is five or more times faster than an input rate of video signals into the motion picture encoder.

* * * * *